US009129633B1

(12) United States Patent
Gan et al.

(10) Patent No.: US 9,129,633 B1
(45) Date of Patent: Sep. 8, 2015

(54) ADAPTIVE DEFECT AVOIDANCE DEVICE

(71) Applicant: Seagate Technology LLC, Cupertino, CA (US)

(72) Inventors: Samuel Gan, Singapore (SG); LiHong Zhang, Singapore (SG); Xiong Liu, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/466,188

(22) Filed: Aug. 22, 2014

(51) Int. Cl.
G11B 21/02 (2006.01)
G11B 5/02 (2006.01)
G11B 5/60 (2006.01)
G11B 27/36 (2006.01)
G11B 17/32 (2006.01)

(52) U.S. Cl.
CPC ............ G11B 5/6076 (2013.01); G11B 5/6005 (2013.01); G11B 17/32 (2013.01); G11B 27/36 (2013.01)

(58) Field of Classification Search
None
See application file for complete search history.

(56) References Cited

U.S. PATENT DOCUMENTS

| 6,088,176 | A | 7/2000 | Smith et al. |
| 6,178,157 | B1 * | 1/2001 | Berg et al. ..................... 369/300 |
| 6,359,759 | B1 | 3/2002 | Congdon et al. |
| 6,563,673 | B2 | 5/2003 | Mundt et al. |
| 6,707,747 | B2 | 3/2004 | Zitlaw et al. |
| 6,710,952 | B1 * | 3/2004 | Smith ............................. 360/31 |
| 6,920,001 | B2 | 7/2005 | Chua et al. |
| 6,940,669 | B2 | 9/2005 | Schaenzer et al. |
| 7,583,467 | B2 * | 9/2009 | Lee ................................ 360/75 |
| 7,684,138 | B2 | 3/2010 | Kitamura et al. |
| 7,733,605 | B2 | 6/2010 | Suzuki et al. |
| 8,416,650 | B2 | 4/2013 | Mori et al. |
| 8,427,770 | B1 | 4/2013 | O'Dell et al. |
| 8,611,031 | B1 | 12/2013 | Tan et al. |
| 8,681,438 | B1 | 3/2014 | Powers et al. |
| 8,687,313 | B2 | 4/2014 | Selvaraj |
| 8,694,841 | B1 * | 4/2014 | Chung et al. ................... 714/723 |
| 8,737,183 | B1 | 5/2014 | Hyde et al. |
| 2003/0193734 | A1 * | 10/2003 | Seing et al. ..................... 360/75 |

* cited by examiner

Primary Examiner — Andrew L Sniezek
(74) Attorney, Agent, or Firm — Hall Estill Attorneys at Law

(57) ABSTRACT

A device may be configured at least with a controller connected to a transducer or transducing assembly that is positioned proximal a data storage medium having at least one thermal asperity or other similar defect. The controller may be configured to select a clearance height above the data storage medium in response to a measured severity of the at least one thermal asperity.

20 Claims, 3 Drawing Sheets

ADAPTIVE DEFECT AVOIDANCE DEVICE

SUMMARY

Assorted embodiments may have at least a controller connected to a transducing assembly or transducer that is positioned proximal a data storage medium having at least one thermal asperity or other similar defect. The controller may be configured to select a clearance height above the data storage medium in response to a measured severity of the at least one thermal asperity

DETAILED DESCRIPTION

The progression of computing devices towards smaller form factors and greater data usage has stressed the data capacity of some data storage devices. For example, the proliferation of high definition video and streaming data in mobile computing devices, such as laptops, tablets, and smartphones, has corresponded with increased data bit density and smaller data storage device form factors in an effort to provide enough capacity to utilize the computing capabilities of the mobile computing devices. Greater data bit density can increase the degree to which physical defects, such as thermal asperities, can degrade performance of a data storage device. Hence, optimized management of data storage device physical defect has garnered industry and consumer interest.

In accordance with various embodiments, a data storage medium having at least one thermal asperity can be positioned proximal a transducing assembly that is connected to a controller that selects a clearance height above the data storage medium in response to a measured severity of a thermal asperity. The ability to adapt the clearance height of the transducing assembly to the severity of the thermal asperity can minimize the number of adjacent data bits that are rendered non-operational through avoidance of the thermal asperity. In other words, correlating the clearance height of the transducing assembly to the measured severity of the thermal asperity can reduce the data bit overhead associated with physically moving the transducing assembly to and from the clearance height proximal the thermal asperity.

Figure 1:
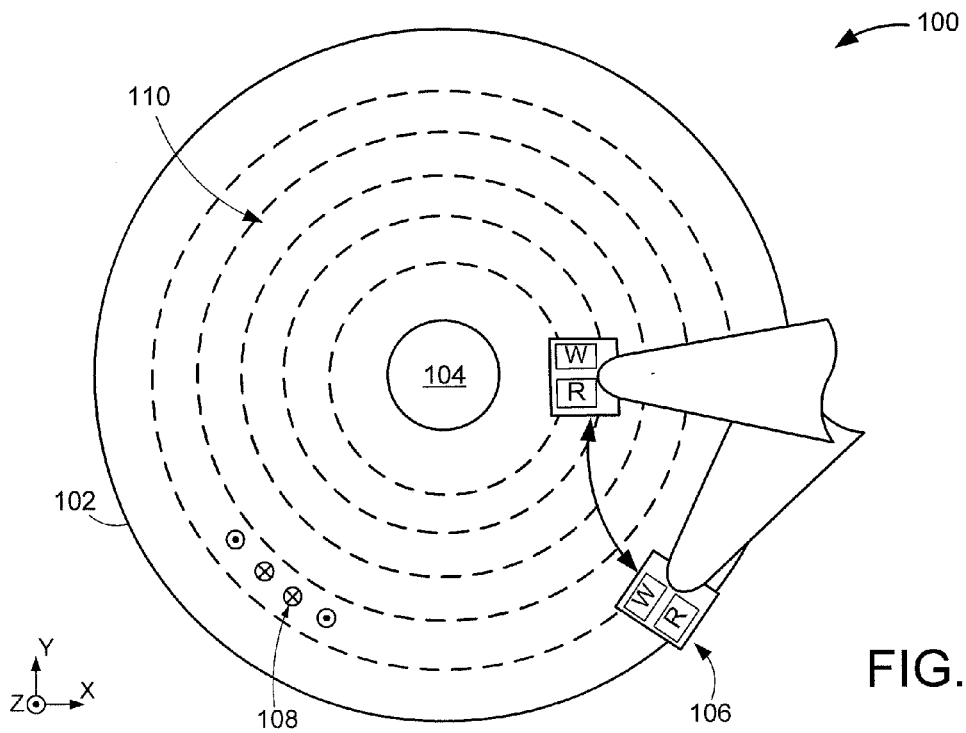
FIG. 1 is a block representation of an example data storage device constructed and operated in accordance with various embodiments.

Although not required or limiting, FIG. 1 is a top view block representation of a portion of an example data storage device 100 in which a defect, like a thermal asperity, may be experienced. The top view of FIG. 1 illustrates a data storage medium 102 that is mounted on a rotatable hub 104. Rotation of the hub can produce an air bearing on which a transducing assembly 106 may fly to access one or more data bits 108 and data tracks 110 individually or concurrently. As shown, the data bits 108 can be arranged with a predetermined density along the substantially circular data tracks 110, which can provide efficient data reading and programming operations to be conducted by the transducing assembly 106.

A decrease in the amount of space between the data bits 108 can provide greater data capacity for the data storage device 100, but can make managing physical defects on the data storage medium 102 more difficult. That is, the presence of a physical defect, like a thermal asperity, on the data storage medium 102 can correspond with data bits 108 proximal the defect becoming non-operational due to the transducing assembly 106 avoiding the defect. It should be noted that while one data storage medium 102 and transducing assembly 106 are displayed in FIG. 1, the data storage device 100 may be configured with a multitude of data storage media and transducing assemblies 106 that can independently and collectively operate to access data bits 108 from one or more different data tracks 110 and sides of the data storage medium 102.

Figure 2:
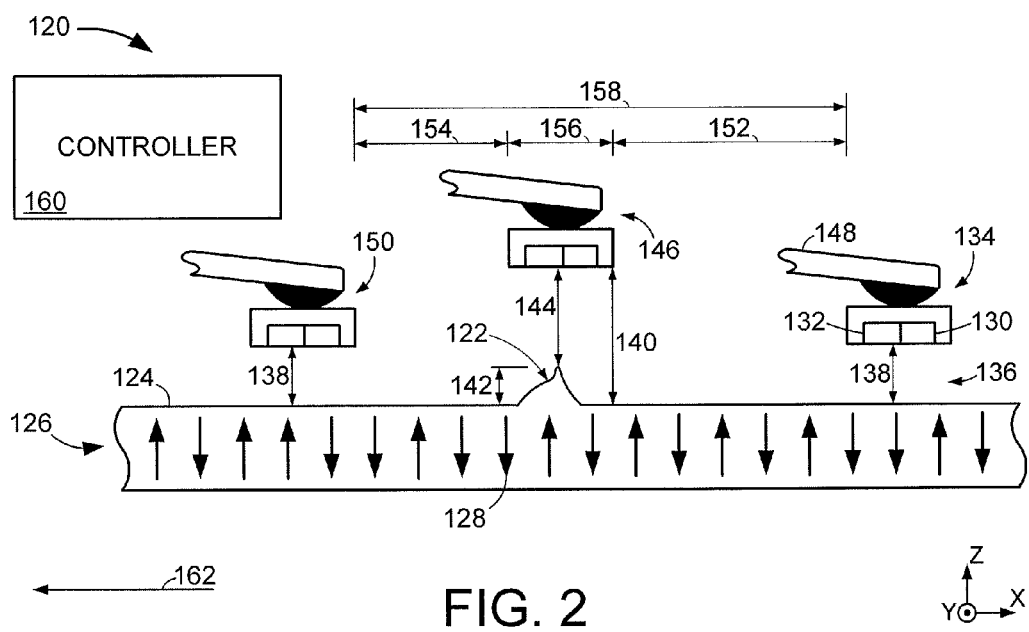
FIG. 2 shows a block representation of a portion of an example data storage device configured in accordance with some embodiments.

FIG. 2 depicts a block representation of a portion of an example data storage device 120 that has a physical defect 122 in accordance with some embodiments. The physical defect 122 is a thermal asperity that can be characterized as a localized change in elevation of a recording surface 124 of a data storage medium 126. The thermal asperity defect 122 can have any size, shape, and position on the data storage medium 126 and may comprise materials that are common or dissimilar to the data storage medium 126. The presence of the thermal asperity defect 122 can hinder access of a data bit 128 by a data reader 130 or data writer 132 portion of a transducing assembly 134, which can be characterized as a magnetoresistive head.

The thermal asperity defect 122 can disturb the air bearing 136 on which the transducing assembly 132 floats and, in some situations, physically impact the transducing assembly 132 to the detriment of future data access operations. As shown by transducing assembly 132, the air bearing 136 can define an operational separation distance 138 between the recording surface 124 and the transducing assembly 134. In response to detection of the physical defect 122, the operational height 138 of the air bearing 136 can be increased to a non-operational clearance height 140, such as the aggregate of the elevation 142 of the defect and an avoidance distance 144, as displayed by transducing assembly 146. It is contemplated that a fly-height adjustment mechanism 148, such as a actuating assembly heater or piezoelectric actuator, can selectively manipulate the air bearing 136 to maintain the operational height 138, lift the transducing assembly 146 to the non-operational height 140, and return to the operational height 138, as illustrated by transducing assembly 150.

With the increased data bit 128 density in the data storage medium 126, the time in which the transducing assembly 132 is not at the operational height 138 renders a number of data bits 128 proximal the defect 122 inaccessible. That is, the transducing assembly 134 cannot read data from, or write data to, the data bits 128 proximal the defect 122 due to the air bearing 136 being too large to allow the transducing aspects of the transducing assembly 134 to accurately access a data bit 128. It is contemplated that fewer data bits 128 can be rendered inaccessible by increasing the speed at which the fly-height adjustment mechanism 148 moves the transducing assembly 132. However, such increased fly-height adjustment mechanism 148 speed can be unreliable and induce momentum that inadvertently hinders access to one or more data bits 128.

In the non-limiting example of FIG. 2, the fly-height adjustment mechanism 148 takes approximately 30 data sectors, as shown by distance 152, to translate the transducing assembly 134 from the operational height 138 to the clearance height 140 and approximately 15 data sectors, as shown by distance 154, to return to the operational height 138. With the clearance height 140 being maintained for a number of data sectors, as represented by distance 156, to ensure avoidance of the physical defect 122, an aggregate distance 158 total of 50 or more data sectors can be rendered non-operational by the presence of the defect 122.

One or more controllers 160, such as a microprocessor or application specific integrated circuit, can be connected to the transducing assembly 134 and data storage medium 126 to conduct data access operations, such as data programming, and defect avoidance. As such, a controller 160 can continuously, sporadically, and routinely manipulate the fly-height adjustment mechanism 148 to maintain the operational height 138, reach the clearance height 140, and return to the operational height 138 to avoid detected defects 122. It is contemplated that the controller can concurrently or independently control the speed of the rotation 162 of the data storage medium 126 to aid in defect 122 detection and avoidance.

In some embodiments, the speed of the data storage medium 126 is reduced while the transducing assembly 134 is translated to the clearance height 140, which may reduce the aggregate non-operational distance 158 and the number of data sectors rendered inaccessible by the defect 122. However, the rotational speed of the data storage medium 126 can be time consuming to alter and would likely result in increased data storage device 120 downtime, which would negate reducing the non-operational distance 158. Hence, reducing the non-operational distance 158 associated with avoiding a defect 122 is sought to be optimized for a constant rotational speed, such as 5400 or 9000 rpm.

Figure 3:
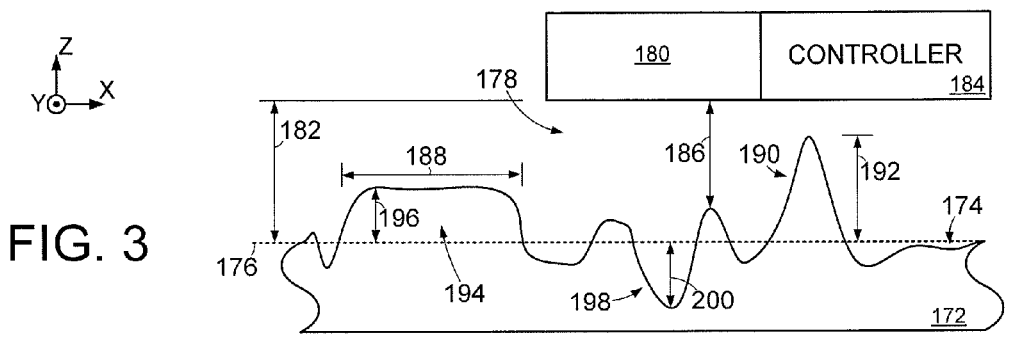
FIG. 3 displays a cross-sectional representation of a portion of an example data storage device arranged in accordance various embodiments.

FIG. 3 displays a cross-sectional representation of a portion of an example data storage device 170 that has a data storage medium 172 with a recording surface 174 configured in accordance with assorted embodiments. Due to a nearly endless number of variables, the recording surface 174 of the data storage medium 172 is not exactly flat, as shown by the ideal planar surface of segmented line 176, but instead has a variety of undulations, pits, and protrusions that can extend above and below the ideal planar surface 166. Although polishing and processing steps can be taken to minimize the presence and severity of elevation changes on the recording surface 174, any number of defects can occur that protrude into the air bearing 178 as a thermal asperity.

In a severe case, a thermal asperity surface defect can extend to an elevation and contact at least a portion of a transducing assembly 180 while the assembly 180 is normal operating at an operational fly height 182. With operational fly heights 172 being reduced to nanometer scale dimensions in some data storage devices, the risk of a thermal asperity contacting the transducing assembly 180 is enough to induce defect avoidance procedures, such as the raising of the transducing assembly 134 in FIG. 2. It is noted that contact between the recording surface 174 and transducing assembly 180 may be promoted in some conditions, such as contact start-stop data storage environments. However, contact of the transducing assembly 180 and data storage medium 172 in sectors designated for data storage, such as user data tracks, can temporarily and permanently impair the performance of the data storage device 170.

Various embodiments configure at least one controller 184, which may be local and remote to the transducing assembly 180, to analyze the recording surface 174 and identify both the presence of defects and the severity of thermal asperities. A controller may utilize one or more test patterns and fly-height adjustments before, during, and after the data storage device 170 is manufactured to detect defects in the recording surface 174. The location of defects may be further analyzed by logging the flying height of the transducing assembly 180 over the defect and calculating a separation distance 186. The separation distance 186 can yield the severity of the defect and, in some embodiments, may encompass the horizontal girth 188 of the defect to render a severity value.

In the non-limiting example of FIG. 3, the transducing assembly 170 can be directed by one or more connected controllers 184 to discern the presence and severity of various recording surface 174 undulations. That is, the controller 184 can conduct any number of passive and active measuring steps to distinguish between the different defects shown in FIG. 3. The controller 184 can identify the first thermal asperity 190 that has a first detected height 192 from the ideal planar recording surface 176. The detected height 192 can correspond with a first severity assigned by the controller 184 and the clearance height to which the transducing assembly 180 is moved to avoid the thermal asperity 190. The controller 184 can concurrently and individually detect a second thermal asperity 194 with girth 188 and a smaller second detected height 196 and assign a second severity that differs from the severity of the first thermal asperity 192.

The ability to evaluate and distinguish the respective thermal asperities 190 and 194 by severity allows the controller 184 to map clearance heights and fly-height adjustment mechanism operation to minimize the number of data sectors, such as data tracks or data bits, that are rendered inaccessible by translating the transducing assembly 180 from the operational height 182 to a clearance height. It is contemplated that the controller 184 can also detect and assign severity to one or more recesses in the recording surface 174. As shown, recess 198 and depth 200 can be ascertained by the controller 184. The identification and classification of both thermal asperities and recesses allows the controller 184 to minimize the clearance height used to avoid thermal asperities and the number of data sectors rendered inaccessible by the presence of the thermal asperity.

Figure 4A:
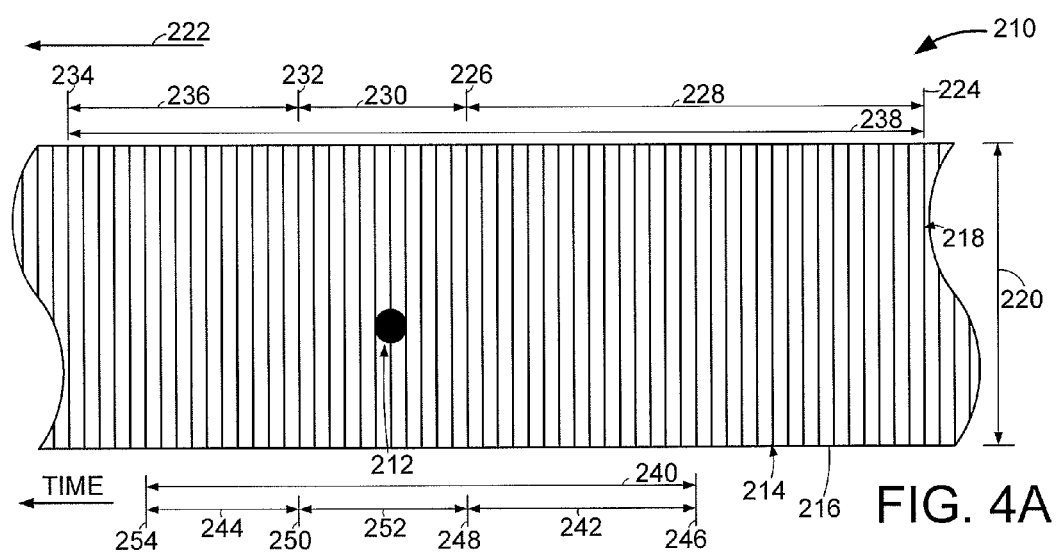
FIGS. 4A and 4B illustrate top view block representations of portions of an example data storage device constructed and operated in accordance with some embodiments.
Figure 4B:
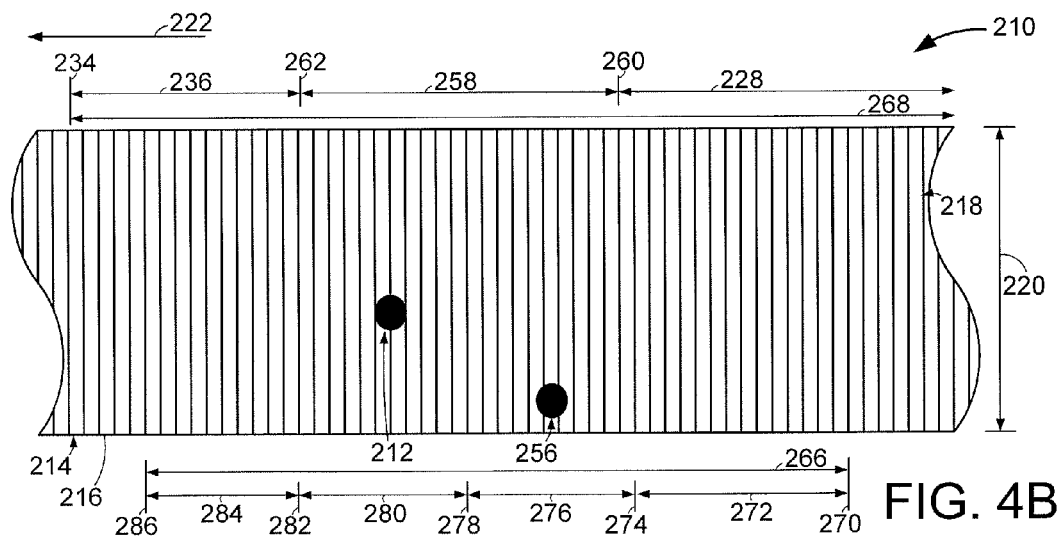

FIGS. 4A and 4B respectively illustrate top view block representations of portions of an example data storage device 210 that is constructed and operated in accordance with various embodiments to detect, classify, and avoid a thermal asperity 212 surface defect of a recording surface 214 of a data storage medium 216. As shown, at least two individual data sectors 218 are occluded by the thermal asperity 212. It should be noted that the size, shape, and position of the thermal asperity 212 is not limited to a particular number of data sectors 218, but can encompass as few as one data sector 218 along any point of the width 220 of the data sector 218, which may correspond with the width of a data track in various embodiments.

It is contemplated that the data storage medium 216 rotates along direction 222 and one or more controllers can direct a transducing assembly to be lifted by a fly-height adjustment mechanism starting at point 224. The fly-height adjustment mechanism can continuously or sporadically raise the transducing assembly from a first height above the recording surface 214, such as an operating height, to a clearance height by point 226. Translation of the transducing assembly to point 226 can take a lift distance 228 that is maintained for a predetermined distance 230 proximal the thermal asperity 212 and begins to lower towards the operational distance at point 232. The transducing assembly reaches the operational air bearing height at point 234 after a lowering distance 236, which corresponds with an overall avoidance distance 238 that can continuously span a relatively large number of data sectors 218.

In accordance with assorted embodiments, a controller classifies the thermal asperity 212 by severity and assigns a clearance height that provides an ample safety factor for the transducing assembly while being smaller than the clearance height used at points 226 and 232. That is, the severity of the thermal asperity 212 may be avoidable with a factor of safety over 1 with a clearance height that is smaller than the height used in points 226 and 232. Conversely, if the thermal asperity 212 was deemed to have a great severity, the clearance height can be increased compared to the height used at points 226 and 232. The ability to adapt the clearance height in relation to the severity of the thermal asperity allows the avoidance distance 238 to be minimized into an adapted avoidance distance 240, when available.

The adapted avoidance distance 240 conducts similar operations as avoidance distance 238, but utilizes a lower clearance height above the recording surface 214 to achieve quicker translation to the adapted clearance height, as shown by distance 242, and from the adapted clearance height to the operational height, as shown by distance 244. The reduced fly-height adjustment time corresponding with the lower adapted clearance height allows the transducing assembly to stay at the operational height for more data sectors 218, compared to point 224, and being lifting at point 246. Points 248 and 250 respectively define the region 252 around the thermal asperity 212 where the adapted clearance height is maintained before returning to the operational height at point 254.

It can be appreciated from FIG. 4A, but the avoidance distances 238 and 240 respectively correspond with different numbers of data sectors 218 that are rendered inaccessible and non-operational by the presence of the thermal asperity 212. Some, or all, of the data sectors 218 within the respective avoidance distances 238 and 240 may be non-defective and already storing data, but are rendered inaccessible due to the transducing assembly deviating from an operational height. It is contemplated that the transducing assembly may be configured to remain active, or be deactivated, during the avoidance distances 238 and 240 to conserve power and conduct maintenance service, such as a microactuator adjustment.

The ability to assess the severity of the thermal asperity 212 can further allow for multiple thermal asperities to be avoided with a reduced number of data sectors 218 being rendered inaccessible. In the non-limiting example of FIG. 4B, a second thermal asperity 256 can have a different severity from the first thermal asperity 212 that is detected and assigned a severity value by at least one local or remote controller. The proximity and severity of the thermal asperities 212 and 256 can be avoided by maintaining a single clearance height for an extended period of time, as shown by distance 258 that spans both asperities 212 and 256 from point 260 to point 262. However, using a single clearance height may render data sectors 218 unnecessarily inaccessible.

By assigning a clearance height for each thermal asperity in relation to the measured severity of the respective asperities 212 and 256, an adapted avoidance distance 266 can be smaller than the avoidance distance 268 that utilizes a single clearance height. The adapted avoidance distance 266 can begin at point 270, which allows the transducing assembly to access a number of additional data sectors 218 compared to avoidance distance 268. Translation of the transducing assembly from the operational height occurs over region 272 and reaches a first clearance height by point 274. The first clearance height can be maintained, lowered, or raised over region 276 to reach a second clearance height by point 278. The second clearance height is maintained over region 280 until point 282 where the transducing assembly begins to lower over region 284 to the operational height that is attained at point 286.

Through the adaptation of the clearance heights according to the severity of the respective thermal asperities 212 and 256, the adapted avoidance distance 266 is optimized so that more data sectors 218 are accessible compared to when a single clearance height is used. It should be noted that the assigning of thermal asperity clearance height based on severity of the thermal asperity, such as height, girth, and shape, can allow any number of different clearance heights to be used regardless of the number of thermal asperities present. Such varying clearance height utilization may optimize the fly-height adjustment mechanism translation of the transducing assembly, as opposed to continuously lowering or raising the transducing assembly.

Figure 5:
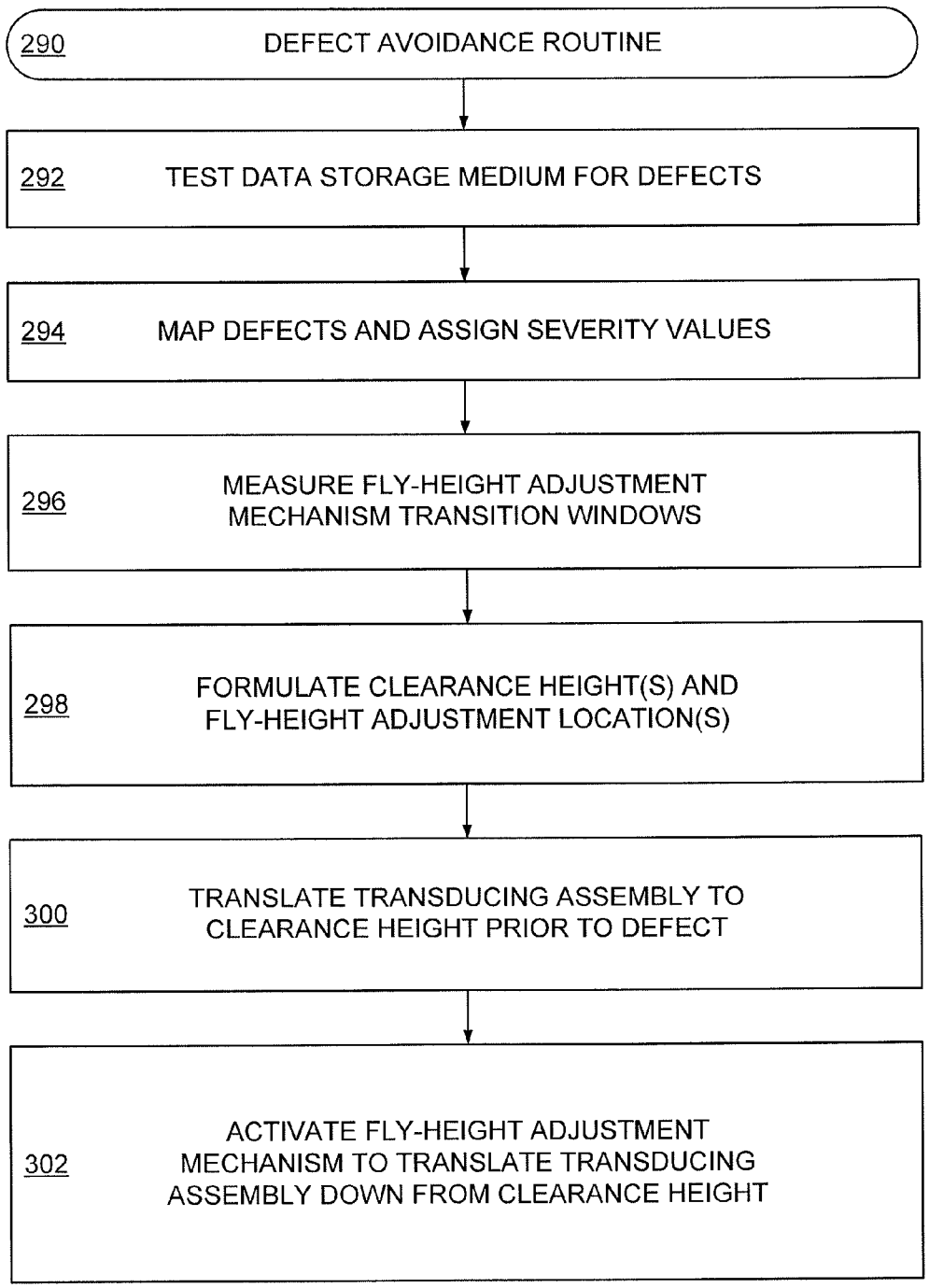
FIG. 5 provides an example defect avoidance routine that may be carried out in accordance with various embodiments.

While the detection and avoidance of any variety of recording surface defects can be carried out in an unlimited variety of manners and routines, FIG. 5 is a flowchart of an example defect avoidance routine 290 that may be conducted in accordance with some embodiments. The routine 290 may begin during manufacturing, such as before any customer data is written to a data storage device, and perform step 292 where at least one data storage medium is tested for defects. The data storage medium may be tested individually and prior to assembly with other data storage media in a data storage device. Testing of a data storage medium may consist of one or more data bit programming and read operations as well as at least one passive sensing operation where a sensor, such as the transducing assembly, measures parameters without writing or reading data bits.

Step 292, in various embodiments, conducts a predetermined pattern of tests that position the transducing assembly at different air bearing heights to detect thermal asperities. Next, step 294 correlates the detected recording surface defects and assigns severity values for each discovered defect. The severity values may be relative, such as 1 for the least severe and 10 for the most severe on the data storage medium, or standard, such as 1 for each nanometer of protrusion from the planar recording surface. It is noted that the identification of the thermal asperity's severity from step 294 may be conducted concurrently with the detection of defects in step 292.

Step 296 may be conducted before, during, and after steps 292 and 294 to measure the fly-height adjustment mechanism speed and efficiency of transitioning between different air bearing heights, such as an operational height to respective first and second clearance heights. It is contemplated that the speed at which the fly-height adjustment mechanism lowers the transducing assembly can be different from the speed at which the transducing assembly is raised. Any number and type of measurements can be made in step 296 to identify one or more transition windows corresponding to the number of data sectors, such as individual data bits, are rendered inaccessible by movement of the transducing assembly. That is, step 296 can take the rotational speed of the data storage medium, speed of the fly-height adjustment mechanism, and density of data sectors into consideration to calculate the number of data sectors that are lost due to lifting and lowering the transducing assembly to various clearance heights to avoid a thermal asperity surface defect.

The identification of the number of inaccessible data sectors corresponding to the transducing assembly transition windows in step 296 can allow step 298 to formulate a clearance heights and fly-height adjustment locations for at least one thermal asperity on a data storage medium. Step 298 can proactively and retroactively set transducing assembly clearance heights in relation to the severity of the respective thermal asperities and set takeoff and lowering points to minimize the number of data sectors rendered inaccessible by the fly height adjustment. While not required or limiting, step 298 can set the clearance height above a detected thermal asperity to be less than a passive clearance height, which brings the transducing assembly closer to the thermal asperity, but provides a safety buffer, such as 1-10 nm, that minimizes the risk of asperity contact while reducing the time and number of data sectors passed as the transducing assembly is lifted from the operational height.

In accordance with some embodiments, such as a 5400 rpm data storage medium, lifting the transducing assembly to a passive clearance height takes 30 data sectors and returning the assembly to the operational height takes 15 data sectors. It is noted that 30 and 15 data sector distances are not required or limiting as the speed of a fly-height adjustment mechanism, speed of the data storage, data sector density, and clearance height can all contribute to any number of data sectors being rendered inaccessible by increasing the air bearing distance. With the characterization of the severity of thermal asperities in routine 290, step 300 can translate the transducing assembly to an adapted clearance height in M data sectors and step 302 can translate the assembly from the adapted clearance height to the operational height in K data sectors depending on the adapted clearance height. Hence, step 298 can provide a data sector savings compared to the passive clearance height according to formula 1:

$$\text{Savings} = (15-K) + (30-M) \quad \text{(Formula 1)}$$

It is contemplated that steps 300 and 302 can be conducted cyclically for any number of detected thermal asperities. Steps 300 and 302 may individually and collectively be conducted incrementally or continuously, such as with multiple thermal asperities being positioned in close proximity, like asperities 212 and 256 of FIG. 4B. It is noted that step 298 may optimize the position at which step 302 is activated to further minimize the number of data sectors rendered inaccessible. For example, step 298 may configure the fly-height adjustment mechanism to begin lowering the transducing assembly before, at, or after the point where the assembly passes over the thermal asperity to reduce the number of data bits within the lowering transition window, such as region 244 of FIG. 4A.

Through the various embodiments of a device capable of adaptively avoiding a thermal asperity, the number of accessible data sectors can be optimized despite the presence of recording surface defects. The ability to detect and measure the severity of a thermal asperity allows clearance heights to be adaptively set to ensure avoidance while minimizing the number of data sectors rendered inaccessible due to the transducing assembly being raised from an operational height. The reduction in lost data sectors can optimize the data capacity of a data storage medium while providing robust thermal asperity avoidance.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the technology to the full extent indicated by the broad general meaning of the terms in which the appended claims are expressed. For example, the particular elements may vary depending on the particular application without departing from the spirit and scope of the present disclosure.

What is claimed is:

1. A method comprising:
   connecting a controller to a transducing assembly positioned proximal a data storage medium having at least one thermal asperity;
   sensing a measured severity of the at least one thermal asperity with the controller; and
   selecting a clearance height with the controller in response to the measured severity to minimize the number of non-operational data sectors proximal the at least one thermal asperity, the clearance height being a separation distance between the data storage medium and the transducing assembly.

2. The method of claim 1, in which the measured severity is sensed by correlating a height of the transducing assembly from the data storage medium when the at least one thermal asperity is detected.

3. The method of claim 1, in which a transducer on the transducing assembly is retracted from an operational height above the data storage medium to the clearance height to avoid the at least one thermal asperity.

4. The method of claim 3, in which the data storage medium continually rotates while the transducer is retracted.

5. The method of claim 1, in which the clearance height is less than a passive height above the data storage medium, the passive height corresponding to a maximum height above the data storage medium.

6. The method of claim 1, in which the controller selects the clearance height to minimize the number of non-operational data sectors proximal the at least one thermal asperity.

7. The method of claim 1, in which the controller maps the at least one thermal asperity prior to user data being written to the data storage medium.

8. An apparatus comprising a controller connected to a transducer proximal a data storage medium having at least one physical defect, the controller configured to select a clearance height in response to a measured severity of the at least one physical defect to minimize the number of non-operational data sectors proximal the at least one thermal asperity, the clearance height being a separation distance between the data storage medium and the transducing assembly.

9. The apparatus of claim 8, in which the physical defect comprises a thermal asperity.

10. The apparatus of claim 8, in which the transducer comprises a fly-height adjustment mechanism configured to position the transducer at a plurality of different clearance heights above the data storage medium.

11. The apparatus of claim 8, in which the at least one physical defect is positioned in a data sector of the data storage medium.

12. The apparatus of claim 8, in which the measured severity of the at least one physical defect corresponds with a height of the at least one physical defect above the data storage medium.

13. A method comprising:
   connecting a controller to a transducing assembly positioned proximal a data storage medium having a first and second thermal asperity;
   sensing first and second measured severities respectively for the first and second thermal asperities with the controller; and
   selecting different first and second clearance heights respectively for the first and second thermal asperities in response to the first and second measured severities to minimize the number of non-operational data sectors proximal the respective first and second thermal asperities, the first clearance height being greater than the second clearance height, each clearance height being a separation distance between the data storage medium and the transducing assembly.

14. The method of claim 13, in which the transducing assembly is maintained over data sectors of the data storage medium while the transducing assembly is adjusted to the respective first and second clearance heights.

15. The method of claim 13, in which the transducing assembly is adjusted from an operational height above the data storage medium to the first clearance height before being adjusted to the second clearance height, the operational height being smaller than the first and second clearance heights.

16. The method of claim 13, in which the transducing assembly is adjusted from an operational height above the data storage medium to the first clearance height then back to the operational height, the operational height being smaller than the first and second clearance heights.

17. The method of claim 16, in which the transducing assembly is adjusted from the operational height to the second clearance height prior to being adjusted to the first clearance height.

18. The method of claim 13, in which a fly-height adjustment mechanism is deactivated to adjust the transducing assembly from an operational height above the data storage medium to the first clearance height, the operational height being smaller than the first and second clearance heights.

19. The method of claim 18, in which the fly-height adjustment mechanism is activated when the transducing assembly passes over the first thermal asperity.

20. The method of claim 18, in which the fly-height adjustment mechanism is not fully retracted at the first clearance height and fully retracted at the second clearance height.

* * * * *